E. RIMAILHO.
HYDRAULIC JOINT CARTRIDGE.
APPLICATION FILED JULY 27, 1917.
1,346,722.
Patented July 13, 1920.
3 SHEETS—SHEET 1.
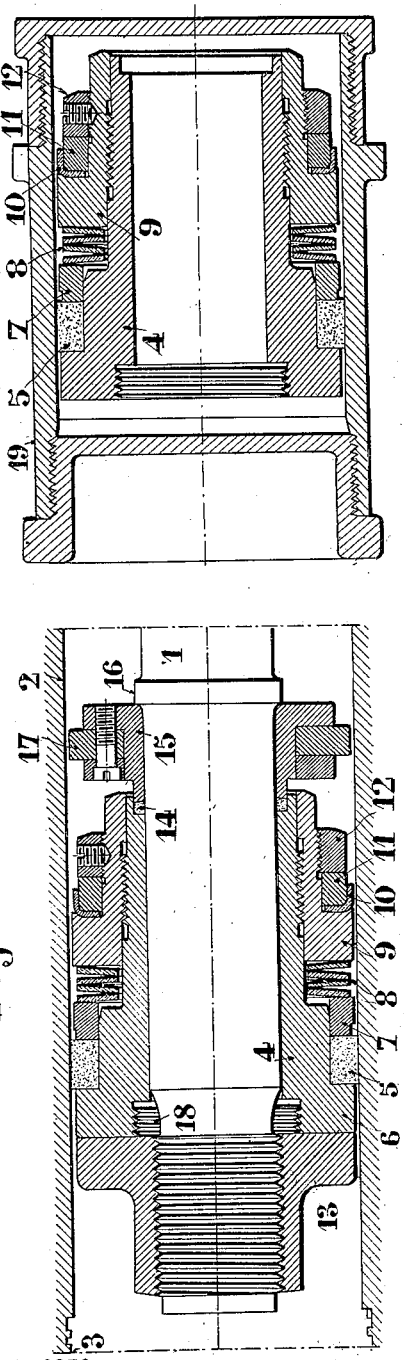
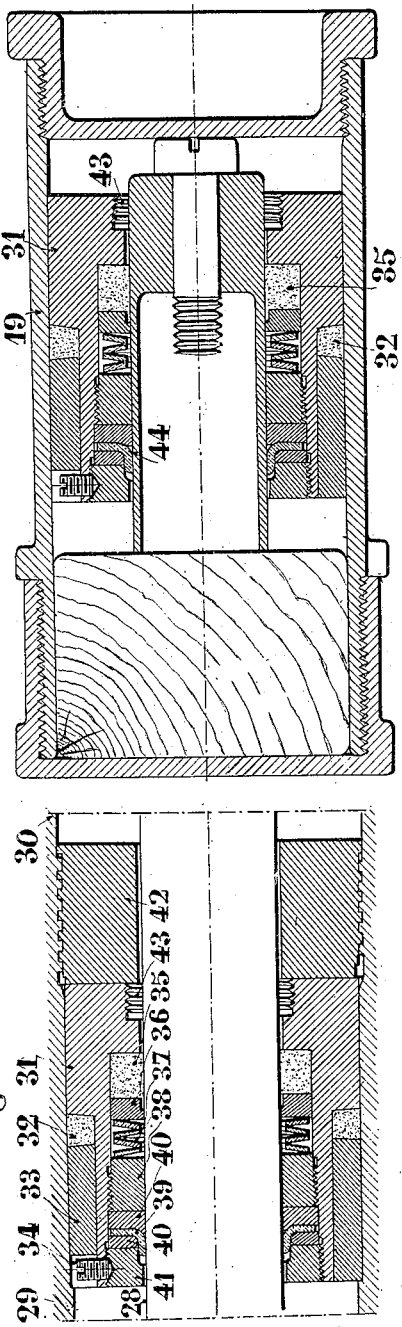
WITNESSES
Joseph Nagy
INVENTOR
Emile Rimailho
BY
ATTORNEYS

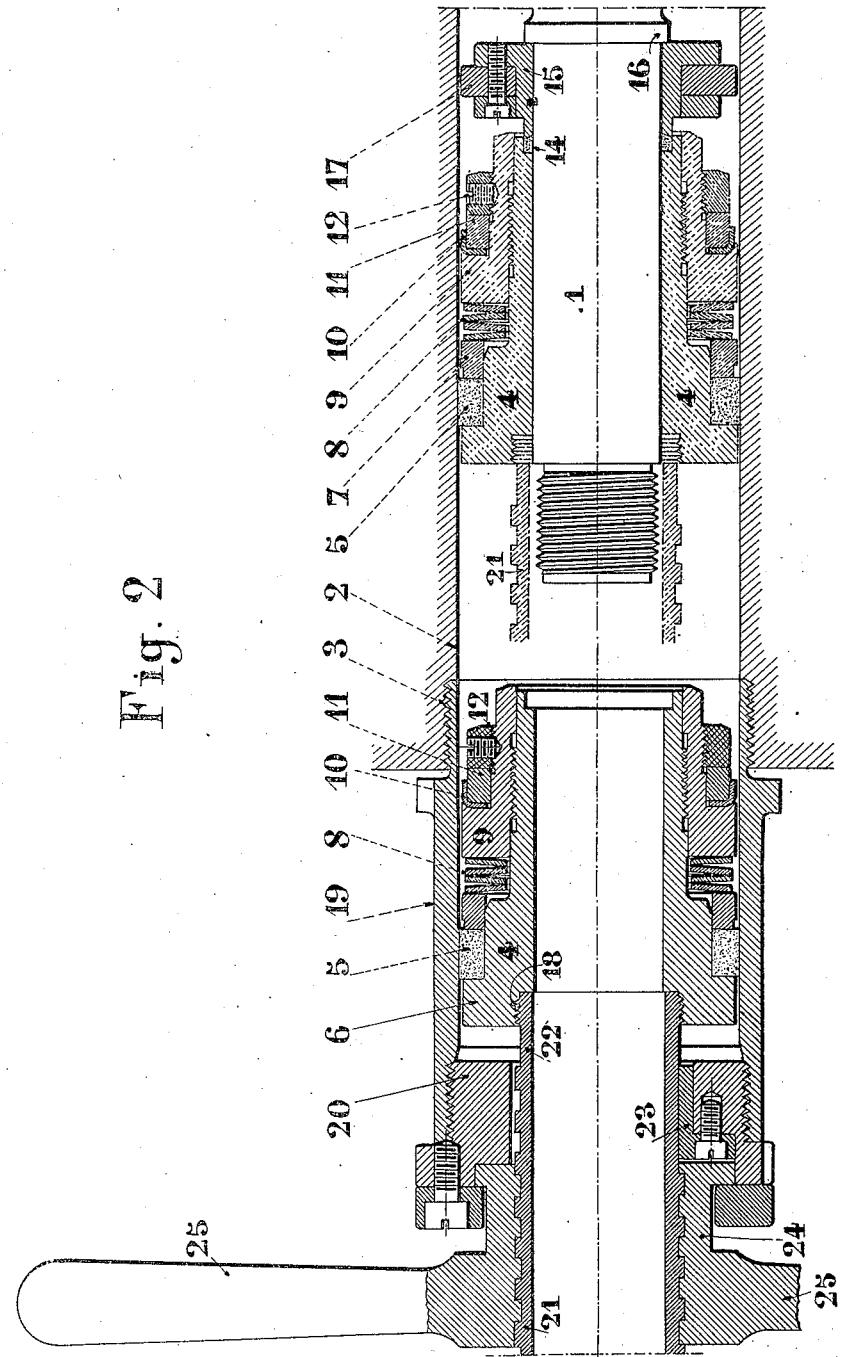

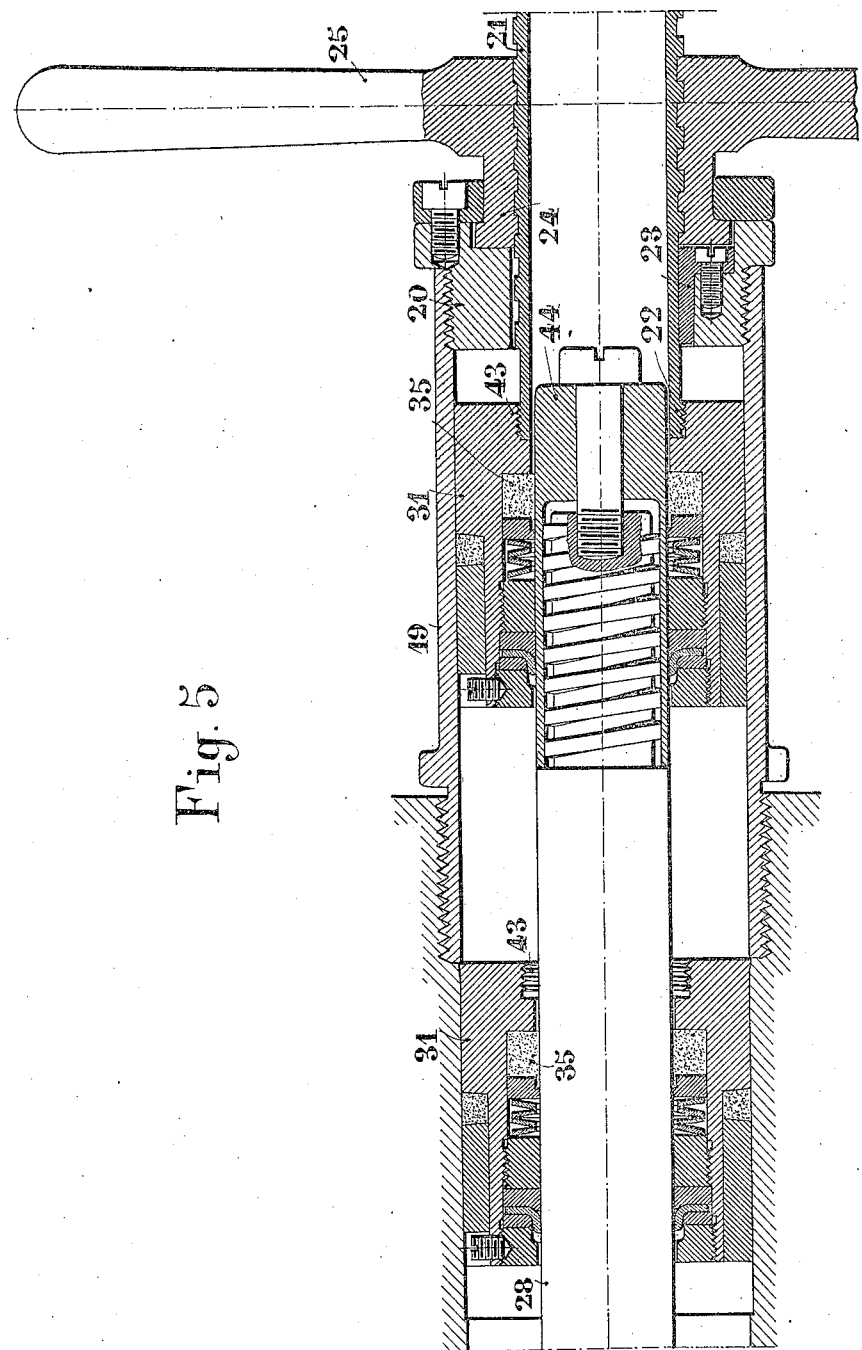

UNITED STATES PATENT OFFICE.

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

HYDRAULIC-JOINT CARTRIDGE.

1,346,722.  Specification of Letters Patent.  Patented July 13, 1920.

Application filed July 27, 1917. Serial No. 183,203.

*To all whom it may concern:*

Be it known that I, EMILE RIMAILHO, a citizen of the French Republic, and residing in Paris, France, 98 Rue de la Victoire, consulting engineer, have invented certain new and useful Improvements in and Relating to Hydraulic-Joint Cartridges, of which the following is a complete specification.

In the ordnance-buffers, and, generally, all the hydraulic machines working under pressure, the importance of the stopping periods is such that the use, for the pistons, rods, or any other sliding organ, of tight and easily mountable joints, capable, at the same time, of a long duration, has always been attempted.

As a result of the difficulty experienced in realizing such conditions of tightness and duration, the most usual hydraulic joints are the chased leathers of the Bramah's type, or the like, and the packings of hemp or other similar material having inconveniences which it has been tried to overcome by merely facilitating the replacing of the same, as soon as their want of tightness is deemed prejudicial or dangerous; the use of improved joints has not been indeed, practically realizable owing to the difficulty of insuring a satisfactory adjustment of such joints without resorting to a specialist workman.

The present invention has for its object an arrangement of removable joint, the organization of which is designed in view of insuring the easy replacing of the same, whatever may be its apparent complexity.

For this purpose, all the organs of the removable joint are assembled upon a same mounting which is previously located into a mounting-tube, in which the joint is definitively adjusted for the use to which it is intended. This mounting-tube has an end suitably threaded for immediately fitting itself upon the buffer or the machine to which self is intended; the organization of the joint is intended; the organization of the joint is such that the workman who effects the mounting has only to insure the strong tightening of the mounting of the joint to obtain its correct setting, without dealing with the joint proper.

In the accompanying drawings, which illustrate, by way of examples, constructional forms of removable joints as applied to the piston-heads or rods used in the buffers for ordnance:—

Figure 1 illustrates a removable joint for a single acting piston-head.

Fig. 2 shows the manner of setting this joint into place.

Fig. 3 shows said removable joint located in its mounting-tube before use.

Fig. 4 illustrates a removable joint for piston-rod.

Fig. 5 shows the manner of setting the same into place.

Fig. 6 illustrates this removable joint in its mounting-tube before use.

In Fig. 1: 1 is the piston-rod arranged into the buffer-cylinder 2 terminating forward by the screw-threads 3; on the rod 1 is provided the mounting 4 of the removable joint, comprising the sliding elastic joint 5 bearing against the shoulder 6 of the mounting through the medium of the joint-ring 7, which transmits to it the adjustment-pressure of the spring washers 8 tightened by the nut 9. Said nut has a wiping leather 10 held by a ring 11 under the clamping action of the nut 12. This whole is tightened on the piston-rod by tightening the nut 13 which presses the internal stationary joint 14 bearing against the ring 15, which is held stationary on the rod 1 by the shoulder 16. The ring 15 bears a centering washer 17 made of soft metal or fiber and notched at its periphery, so as to have only few points of contact with the cylinder. It is to be observed that the mounting 4 alone bears all the organs of the sliding joint and that it has, at the front, a screw-threaded recess 18, which is provided in order to enable the momentary fixing of the mounting screw.

In Fig. 4: 28 is the piston-rod, 29 the buffer-cylinder, 30 the external end-face, 31 the mounting of the joint bearing externally a stationary joint 32 propped by the ring 33, which is held on the body by the stud 34; the mounting 31 bears internally the sliding elastic joint 35 propped by the ring 36 under the adjustment-tension of the spring-washers 37 tightened by the nut 38. In front of said nut is located a wiping leather 39 comprised between two distance-rings 40; this wiping leather is clamped by the nut 41. The whole of the removable joint is tightened up into the housing provided in the cylinder by the nut 42.

It is to be noted that the mounting 31 has, at the rear, a screw threaded recess 43 (similar to that of Fig. 1) which is provided in order to enable the momentary fixing of the mounting screw.

Fig. 2 illustrates the manner of setting into place the removable joint for piston-head of Fig. 1 at the beginning of the insertion of the joint into the cylinder 2 by means of the mounting apparatus.

In the threads 3 provided at the front of the cylinder is screwed the mounting tube 19, of internal diameter equal to that of the cylinder 2, and which is provided with a plug 20 leaving free passage to the operating screw 21, the end of which 22 has been screwed into the threaded recess 18 of the mounting 4. This screw, guided by the feather 23, can move longitudinally under the action of the nut 24 provided with the handles 25.

Fig. 5 illustrates the same mounting-apparatus as adapted to the mounting of a removable joint for piston-rod. It is to be observed that, for maintaining and protecting the internal sliding elastic joint 35, a tube 44 has been located inside the mounting. This tube is utilized for the mounting in order to enable the passage of the sliding elastic joint 35, without any risk of interference, above the screw-threads which exist almost generally at the end of a piston-rod.

The organization of the cartridge of the removable joint being known, as well as that of its mounting-apparatus, it is easy to understand the use of the same for setting into place a removable joint for piston-head.

The mounting tube 19 having been screwed and tightened up on the cylinder 2, the operating screw 21 is screwed into the threaded recess 18 of the mounting 4. The plug 20 is thereafter set into place, as well as the other organs of the apparatus. Under the action of the nut 24, the screw moves itself longitudinally, while pushing before itself the whole of the removable joint, and causes the latter to pass into the cylinder 2, while capping the end of the piston rod 1 held centrally by the washer 17.

The joint is thus pushed until it becomes tightened on the stationary joint 14. At this moment the operating nut 24 is removed, as well as the feather 23, the screw 21 is unscrewed from the mounting 4 and the mounting-tube is removed. It rests only to screw, until it be completely tightened up, the nut 13 on the rod 1, thereby insuring the fixing of the whole of the piston-head.

The operation of dismantling the removable joint is effected by approximately following the reverse sequence of the above described operations.

It is obvious that, in the case when the clamping of the removable joint into the mounting-tube is not very strong, the mounting-apparatus may be replaced by a mounting-rod and that the whole of the joint can then be pulled or pushed manually, according to the operation to be effected.

What I claim is:—

1. In combination, a piston rod having a collar, a washer on the piston rod in engagement with the collar thereof, a hydraulic joint on the piston rod and in engagement with the washer, said joint including a mounting having at one end a threaded recess for the connection of a tool therewith, and a nut on the piston rod and engaging the mounting to clamp the joint on the piston rod.

2. In combination with a piston rod having a collar, a centering washer on the rod, a removable hydraulic joint slidably mounted on the rod, said centering washer adapted to be interposed between the collar and the joint, and means adapted to engage the rod for preventing the joint from sliding on the rod.

3. In combination, a cylinder, a piston rod therein, a hydraulic joint in said cylinder, a centering washer on the rod for maintaining the rod coaxial with the cylinder, said hydraulic joint having a snug fit on the rod, said rod having a shoulder against which the centering washer is maintained by the joint when the same is on to the rod within the cylinder, and means for locking the joint to the rod.

4. In a hydraulic joint cartridge, a piston rod, a mounting adapted to have a tight fit on the piston rod, said mounting having a shoulder in one end thereof, a sliding joint abutting against said shoulder, a ring engaging said joint, a nut threaded on to the other end of the mounting, yielding members interposed between the ring and the nut to move the joint against the shoulder, said nut having an outer reduced threaded surface whereby a head is formed at one end of the nut, a dished washer resting against said head, a ring maintaining said dished washer against the head, and a threaded ring engaging the reduced threaded surface of the nut maintaining said ring and dished washer against the head of the nut.

In testimony whereof I have hereunto set my hand at St.-Etienne, France, this 20th day of June, 1917.

EMILE RIMAILHO.

In the presence of two witnesses:
JEAN BRUYEROY,
DAVIS B. LEWIS.